Oct. 25, 1955
V. MOORE
2,721,457
FLEXIBLE COUPLING
Filed Jan. 29, 1952
2 Sheets-Sheet 1
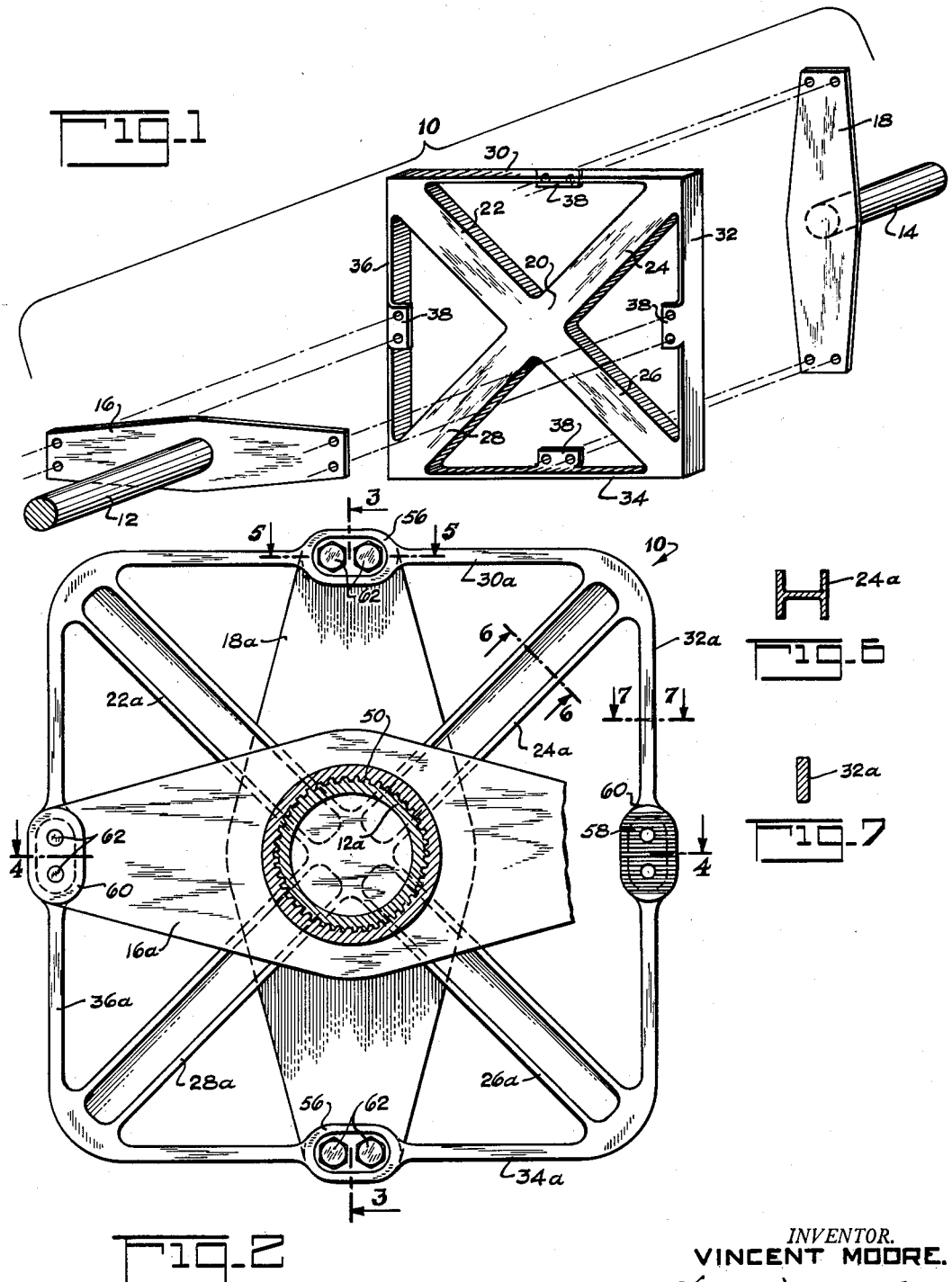
INVENTOR.
VINCENT MOORE.
BY Victor D. Behn
ATTORNEY Oct. 25, 1955 V. MOORE 2,721,457
FLEXIBLE COUPLING
Filed Jan. 29, 1952 2 Sheets-Sheet 2
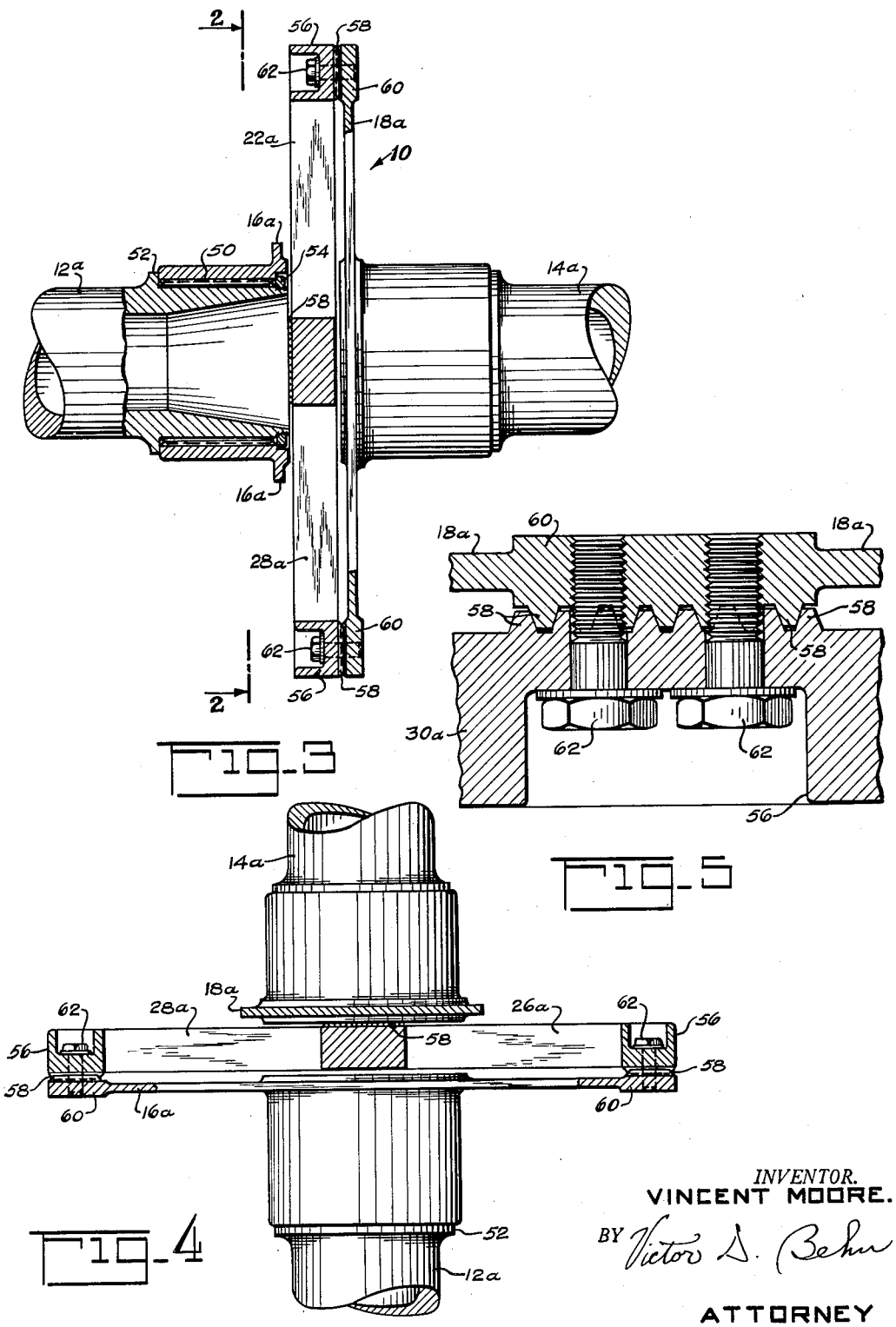
INVENTOR.
VINCENT MOORE.
BY
ATTORNEY United States Patent Office 2,721,457
Patented Oct. 25, 1955

2,721,457

FLEXIBLE COUPLING

Vincent Moore, Glen Rock, N. J., assignor to Curtiss-Wright Corporation, a corporation of Delaware Application January 29, 1952, Serial No. 268,822

4 Claims. (Cl. 64—15)

This invention relates to flexible couplings for transmitting torque and is particularly directed to such a coupling permitting lateral, angular and axial displacement of said shafts relative to each other.

An object of the present invention comprises the provision of a novel and simple flexible coupling of compact design for drivably connecting a pair of shafts and providing said lateral, angular and axial freedom of said shafts. A still further object of the invention comprises the provision of such a flexible coupling in which said coupling flexibility is not provided by loose, sliding or other such joints which would have to be lubricated to prevent chafing or wear and instead said coupling flexibility is entirely provided by elastic deformation of the coupling parts.

Other objects of the invention will become apparent upon reading the annexed detailed description in connection with the drawing in which:

Fig. 1 is an exploded schematic perspective view of a coupling embodying the invention.

Fig. 2 is a transverse sectional view of a more practical design of a coupling embodying the invention and taken along line 2—2 of Fig. 3; and Figs. 3, 4, 5, 6 and 7 are sectional views taken along lines 3—3, 4—4, 5—5, 6—6, and 7—7 respectively of Fig. 2.

Referring first to Fig. 1 of the drawing; a coupling 10 is provided for flexibly connecting shafts 12 and 14 so as to permit lateral, angular and axial displacements of said shafts relative to each other while said shafts are transmitting torque from one to the other through said coupling. The shafts 12 and 14 are substantially co-axial relative to each other and with the axis of the coupling.

The coupling 10 comprises a first coupling member 16 secured to the shaft 12 intermediate its ends and disposed at right angles to said shaft. A second coupling member 18 is secured to the shaft 14 intermediate its ends and is disposed at right angles to said shaft 14 and at right angles to the first coupling member 16. As illustrated, each coupling member 16 and 18 is flat in a plane transverse to the coupling axis whereby each said member is relatively torsional rigid with its respective shaft but each said member is relatively flexible for elastic bending about any axis transverse to the axis of its shaft. Thus with its ends fixed, each member 16 or 18 can flex to permit angular as well as axial movement of the shaft connected thereto.

A torsionally rigid third coupling member or structure 20 is co-axially disposed between the coupling members 16 and 18. As illustrated, the coupling structure 20 is a relatively rigid X-shaped frame having radially disposed arms or beams 22, 24, 26 and 28 which are connected together at their inner ends.

The X-shaped coupling member 20 is drivably connected to the coupling members 16 and 18 transmitting torque therebetween. For this purpose, relatively flexible elongate blade-like members 30, 32, 34 and 36 connect the outer ends of the beams 22, 24, 26 and 28, the elongate member 30 connecting ends of the beams 22 and 24, the elongate member 32 connecting the ends of the beams 24 and 26, the elongate member 34 connecting the ends of the beams 26 and 28 and the elongate member 36 connecting the ends of the beams 28 and 22. As is illustrated, the elongate members 30, 32, 34 and 36 are disposed so as substantially to form the sides of a square about the coupling axis with the elongate members 30 and 34 being disposed parallel to each other on opposite sides of and extending transverse to the coupling axis and with the members 32 and 36 being similarly disposed but rotatively displaced 90° from the members 30 and 34.

In addition, in order to drivably connect the coupling members 16, 18 and 20, the intermediate or mid-portion of each elongate member 30, 32, 34 and 36 is provided with a flange 38 for connection to the coupling members 16 and 18. The mid-portion of the elongate member 30 is connected to one end of the coupling member 18 diametrically opposite to a corresponding connection of the mid-portion of the parallel elongate member 34 to the other end of the coupling member 18. Similarly the mid-portion of the elongate member 32 is connected to one end of the coupling member 16 diametrically opposite to a corresponding connection of the mid-portion of the parallel elongate member 36 to the other end of the coupling member 16.

With this construction, the flexible elongate members 30, 32, 34 and 36 drivably connect the coupling members 16, 18 and 20. The X-shaped frame or coupling member 20 is relatively rigid. The elongate members 30, 32, 34 and 36, however, are flat and relatively thin to permit elastic radial flexing or bending of their mid-portions toward and away from the coupling axis. This radial flexibility of the elongate members 30, 32, 34 and 36 permits lateral displacements in any radial direction of the shafts 12 and 14 relative to each other. In addition, the flexibility of the coupling members 16 and 18 permits angular displacement of the shafts 12 and 14 in any direction relative to each other as well as axial displacements of said shafts relative to each other. Thus, the coupling 10 although torsionally rigid provides a limited amount of lateral, angular and axial freedom of the shafts 12 and 14 relative to each other and this flexibility is provided entirely by elastic deformation of the parts making up said coupling.

The elastic flexibility of each of the coupling members 16 and 18 by itself provides for angular and axial displacements of the shafts 12 and 14 relative to each other. Accordingly it is only necessary that one of the coupling members 16 or 18 be flexible although preferably both said members are flexible as described.

Obviously either coupling member 16 or 18 could be the torque input member of the coupling with the other of said members being the torque output member of the coupling. Thus the coupling 10 can transmit torque in either direction between the shafts 12 and 14. Also, if torque is only to be transmitted in one direction, for example clockwise as viewed in Fig. 1 and from the shaft 12 to the shaft 14, then the elongate blade-like members would only have to be connected to the frame beams 24 and 28.

A certain amount of flexibility is inherent in any structure. Accordingly even though the X-shaped coupling frame 20 is of a relatively rigid construction some amount of angular and axial freedom of the shafts 12 and 14 necessarily is provided by said frame. The amount of said angular and axial freedom provided by said frame 20 obviously can be varied by varying the size, shape, etc. of the parts making up said frame. Likewise it is clear that if a certain amount of torsional flexibility is desired of the coupling, this could be introduced by making said coupling frame 20 torsionally flexible to the extent desired. Furthermore, said frame 20 obviously need not have the X-shape disclosed. This X-shape, however, provides a simple, light weight construction for carrying the loads imposed as a result of torque transmission by the coupling. In addition, instead of the elongate blade-like members being integrally connected at their ends to the X-shaped frame 20 said members obviously could be separately fabricated and then connected at their ends rigidly or even flexibly to said frame.

Figs. 2-7 illustrate a coupling similar to that illustrated in Fig. 1 but with the various parts having a more practical shape and construction. The parts of the coupling of Figs. 2-7 have been designated by the same reference numerals but with a subscript $a$ added thereto as the corresponding parts of Fig. 1. Accordingly no detailed description of the coupling 10a of Figs. 2-7 appears necessary and the description of said coupling will be confined to those structural features not appearing in Fig. 1.

In the coupling 10a, the coupling member 16a has a hub which is drivably connected to the shaft 12a by splines 50 and said coupling member is held on the shaft 12 between a flange 52 and a nut 54. The coupling member 18a may be similarly secured and drivably connected to the shaft 14a.

In order to secure the ends of the coupling members 16a and 18a to the mid-portions of the elongate members 30a, 32a, 34a and 36a, each of said mid-portions is provided with a boss 56 having splines 58 mating with corresponding splines on a boss 60 formed on the end of a coupling member 16a or 18a to which said midportion is connected. Screws 62 are provided for securing each pair of mating bosses 56 and 60 together but at least the major portion of the torque transmitted through each said pair of bosses is transmitted through their splines 58. This splined construction is best seen in Fig. 5.

Each of the beams 22a, 24a, 26a, and 28a has an H-shaped cross-section, as illustrated in Fig. 6, to provide the desired rigidity and strength while each elongate blade-like member 30a, 32a, 34a and 36a has the flat or rectangular cross-section illustrated in Fig. 7 to give said members the desired flexibility.

The lateral, angular and axial freedom provided by the coupling 10a of Figs. 2-7 is obviously substantially the same as the corresponding lateral, angular and axial freedom provided by the coupling 10 of Fig. 1.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A flexible coupling comprising substantially co-axial first and second coupling members extending transversely across the coupling axis, each of said members being rigid torsionally and at least one of said members being flexible for elastic bending for movement of its outer ends substantially parallel to said axis; a first pair of parallel elongate flat metallic members symmetrically disposed on opposite sides of the coupling axis and extending transverse to the coupling axis with their flat sides disposed parallel to said axis, each of said elongate flat members being rigidly connected intermediate its ends to said first coupling member diametrically opposite to the corresponding connection of the other of said elongate members to said first coupling member; a second pair of parallel elongate flat metallic members also symmetrically disposed on opposite sides of and extending transverse to the coupling axis but rotatively displaced 90° from said first pair and with their flat sides disposed parallel to said coupling axis, each of the elongate flat members of said second pair being rigidly connected intermediate its ends to said second coupling member diametrically opposite to the corresponding connection of the other elongate member of said second pair to said second coupling member, said elongate flat members being flexible for movement of their intermediate portions toward and away from the coupling axis; and a torsionally rigid member connected to the ends of said elongate members.

2. A flexible coupling comprising substantially co-axial first and second coupling members, each of said members having a torque transmitting hub intermediate its ends and having a pair of arms extending in diametrically opposite directions from their said hub, each of said arms being relatively wide in a circumferential direction and being relatively thin in an axial direction whereby said arm is rigid for torque transmission and its outer end can flex in a direction substantially parallel to the coupling axis; a first pair of parallel elongate flat metallic members symmetrically disposed on opposite sides of the coupling axis and extending transverse to the coupling axis with their flat sides disposed parallel to said axis, each of said elongate flat members being rigidly connected intermediate its ends to the outer end of one of the extending arms of said first coupling member diametrically opposite to the corresponding connection of the other of said elongate flat members to the other extending arm of said first coupling member; a second pair of parallel elongate flat metallic members also symmetrically disposed on opposite sides of and extending transverse to the coupling axis but rotatively displaced 90° from said first pair and with their flat sides disposed parallel to said coupling axis, each of the elongate flat members of said second pair being rigidly connected intermediate its ends to the outer end of one of the extending arms of said second coupling member diametrically opposite to the corresponding connection of the other elongate flat member of said second pair to the other extending arm of said second coupling member, said elongate flat members being flexible for movement of their intermediate portions toward and away from the coupling axis; and a torsionally rigid member connecting the ends of said elongate members.

3. A flexible coupling comprising substantially co-axial first and second coupling members, each of said members having a torque transmitting hub intermediate its ends and having a pair of flat arms extending in diametrically opposite directions from their hub with the flat sides of said arms disposed transverse to the coupling axis, each of said arms being wide circumferentially for torsional rigidity and being thin in an axial direction to permit the outer end of said arm to flex in a direction substantially parallel to the coupling axis; a first pair of parallel elongate flat metallic members symmetrically disposed on opposite sides of the coupling axis and extending transverse to the coupling axis with their flat sides disposed parallel to said axis, each of said elongate flat members being rigidly connected intermediate its ends to the outer end of one of the flat arms of said first coupling member diametrically opposite to the corresponding connection of the other of said elongate flat members to the other flat arm of said first coupling member; a second pair of parallel elongate flat metallic members also symmetrically disposed on opposite sides of and extending transverse to the coupling axis but rotatively displaced 90° from said first pair and with their flat sides disposed parallel to said coupling axis, each of the elongate flat members of said second pair being rigidly connected intermediate its ends to the outer end of one of the flat arms of said second coupling member diametrically opposite to the corresponding connection of the other elongate flat member of said second pair to the other flat arm of said second coupling member, said elongate flat members being flexible for movement of their intermediate portions toward and away from the coupling axis; and a torsionally rigid member rigidly connected to the ends of said elongate members.

4. A flexible coupling comprising substantially co-axial first and second coupling members extending transversely across the coupling axis, each of said members being rigid torsionally and at least one of said members being flexible for elastic bending for movement of its outer ends substantially parallel to said axis; a first pair of parallel elongate metallic members symmetrically disposed on opposite sides of and transverse to the coupling axis, each of said elongate members being rigidly connected intermediate its ends to said first coupling member diametrically opposite to the corresponding connection of the other of said elongate members to said first coupling member; a second pair of parallel elongate metallic members also symmmetrically disposed on opposite sides of and transverse to the coupling axis but rotatively displaced 90° from said first pair, each of the elongate members of said second pair being rigidly connected intermediate its ends to said second coupling member diametrically opposite to the corresponding connection of the other elongate member of said second pair to said second coupling member, each of said elongate members being flexible for movement of its intermediate portion toward and away from the coupling axis but being relatively rigid against tension and compression forces in the direction of its long dimension; and a torsionally rigid member rigidly connected to the ends of said elongate members.

References Cited in the file of this patent

UNITED STATES PATENTS

| | | |
|---|---|---|
| 1,392,342 | Laycock | Oct. 4, 1921 |
| 1,672,398 | Treschow | June 5, 1928 |
| 2,566,575 | Mann | Sept. 4, 1951 |

FOREIGN PATENTS

| | | |
|---|---|---|
| 235,396 | Great Britain | 1925 |